United States Patent
Reams

(10) Patent No.: US 9,401,084 B2
(45) Date of Patent: *Jul. 26, 2016

(54) ASSISTING USE OF CONTROL DEVICES WITH DIFFERENT ELECTRONIC DEVICES

(71) Applicant: ECHOSTAR TECHNOLOGIES L.L.C., Englewood, CO (US)

(72) Inventor: William R. Reams, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 113 days.

This patent is subject to a terminal disclaimer.

(21) Appl. No.: 14/336,879

(22) Filed: Jul. 21, 2014

(65) Prior Publication Data

US 2014/0327525 A1  Nov. 6, 2014

Related U.S. Application Data

(63) Continuation of application No. 13/287,988, filed on Nov. 2, 2011, now Pat. No. 8,786,413.

(51) Int. Cl.
   *G05B 11/01* (2006.01)
   *G08C 17/02* (2006.01)
   (Continued)

(52) U.S. Cl.
   CPC ............... *G08C 17/02* (2013.01); *G05B 15/02* (2013.01); *G08C 2201/21* (2013.01); *G08C 2201/50* (2013.01); *H04N 21/42207* (2013.01); *H04N 21/42221* (2013.01); *H04N 2005/4442* (2013.01)

(58) Field of Classification Search
   CPC ................................. G05B 15/02; G08C 17/02
   See application file for complete search history.

(56) References Cited

U.S. PATENT DOCUMENTS 7,433,930 B2  10/2008  Fenizia et al.
7,516,251 B2   4/2009  Tanaka et al.
(Continued)

FOREIGN PATENT DOCUMENTS

EP   1345424 A1    9/2003
EP   1647958 A1    4/2006
WO   2010112972 A2  10/2010

OTHER PUBLICATIONS

European Patent Office "International Search Report and Written Opinion" dated Feb. 22, 2013 for International Appln. No. PCT/US2012/058006, filed Sep. 28, 2012.

(Continued)

*Primary Examiner* — Omeed Alizada
(74) *Attorney, Agent, or Firm* — Ingrassia Fisher & Lorenz, P.C.

(57) ABSTRACT

A remote determines an acknowledgement is not received for a command transmitted to a first device, broadcasts a discovery message, receives a response from a second device that received the discovery message and a proximity signal from the remote, and configures itself to control the second device. The remote may also transmit an acknowledgement to the second device. The second device may notify the first device. In various implementations, configuration information in the response may include pairing information and the remote may unpair itself from the first device and pair with the second device. In some implementations, the remote may include a table for controlling devices and the remote may utilize an entry in the table for the second device instead of the first device. In various implementations, the remote may receive responses to the discovery message from multiple devices and may select one to configure itself to control.

18 Claims, 10 Drawing Sheets

(51) Int. Cl.
*G05B 15/02* (2006.01)
*H04N 5/44* (2011.01)
*H04N 21/422* (2011.01)

(56) References Cited

U.S. PATENT DOCUMENTS

| | | | |
|---|---|---|---|
| 7,962,097 | B2 | 6/2011 | Jung et al. |
| 8,126,938 | B2 | 2/2012 | Cohen et al. |
| 8,545,331 | B2 | 10/2013 | Reams |
| 2003/0233436 | A1 | 12/2003 | Slemmer et al. |
| 2006/0253330 | A1 | 11/2006 | Maggio et al. |
| 2010/0328132 | A1 | 12/2010 | Reams et al. |

OTHER PUBLICATIONS

U.S. Patent and Trademark Office, Notice of Allowance, mailed Mar. 25, 2014 for U.S. Appl. No. 13/287,988.

Canadian Intellectual Property Office, Official Action in Canadian Patent Application No. 2,849,915 mailed Aug. 27, 2015.

ASSISTING USE OF CONTROL DEVICES WITH DIFFERENT ELECTRONIC DEVICES

FIELD OF THE INVENTION

This disclosure relates generally to control devices, and more specifically to assisting the use of control devices with different electronic devices.

SUMMARY

The present disclosure discloses systems and methods for assisting use of control devices with different electronic devices. A control device may transmit a command to a first electronic device that the control device is configured to control. If the control device determines that an acknowledgement is not received in response to the command, the control device may broadcast a discovery message to all electronic devices that are operable to be controlled by the control device and are within range of the signal utilized to broadcast the discovery message. The control device may receive a response to the discovery message from a second electronic device that received the discovery message and at least one proximity signal that was transmitted by the control device. Utilizing configuration information included in the response, the control device may configure itself to control the second electronic device.

In various implementations, the control device may transmit an acknowledgement to the second electronic device indicating that the control device is now configured to control the second electronic device. In some implementations, if the second electronic device is configured to communicate with the first electronic device, the second electronic device may notify the first electronic device that the control device is now configured to control the second electronic device.

In one or more implementations, the configuration information may include pairing information for pairing the control device with the second electronic device. In such implementations, configuring the control device to control the second electronic device may include unpairing the control device from the first electronic device and utilizing the pairing information to pair with the second electronic device. In one or more other implementations, the control device may include a table of control entries for controlling one or more of a plurality of electronic devices. In such implementations, configuring the control device to control the second electronic device may include configuring the control device to utilize an entry in the table for the second electronic device instead of an entry for the first electronic device.

In various implementations, the control device may receive responses to the discovery message from a variety of different electronic devices. In such implementations, the control device may select one of the responding electronic devices and configure itself to control the selected responding electronic device. Such selection may be based on which response is received first, which response is carried by a signal with the highest signal strength, which responses include a valid authorization identifier, whether the control device has previously been configured to control an electronic device corresponding to a response, user input specifying which responding electronic device to select, and so on.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
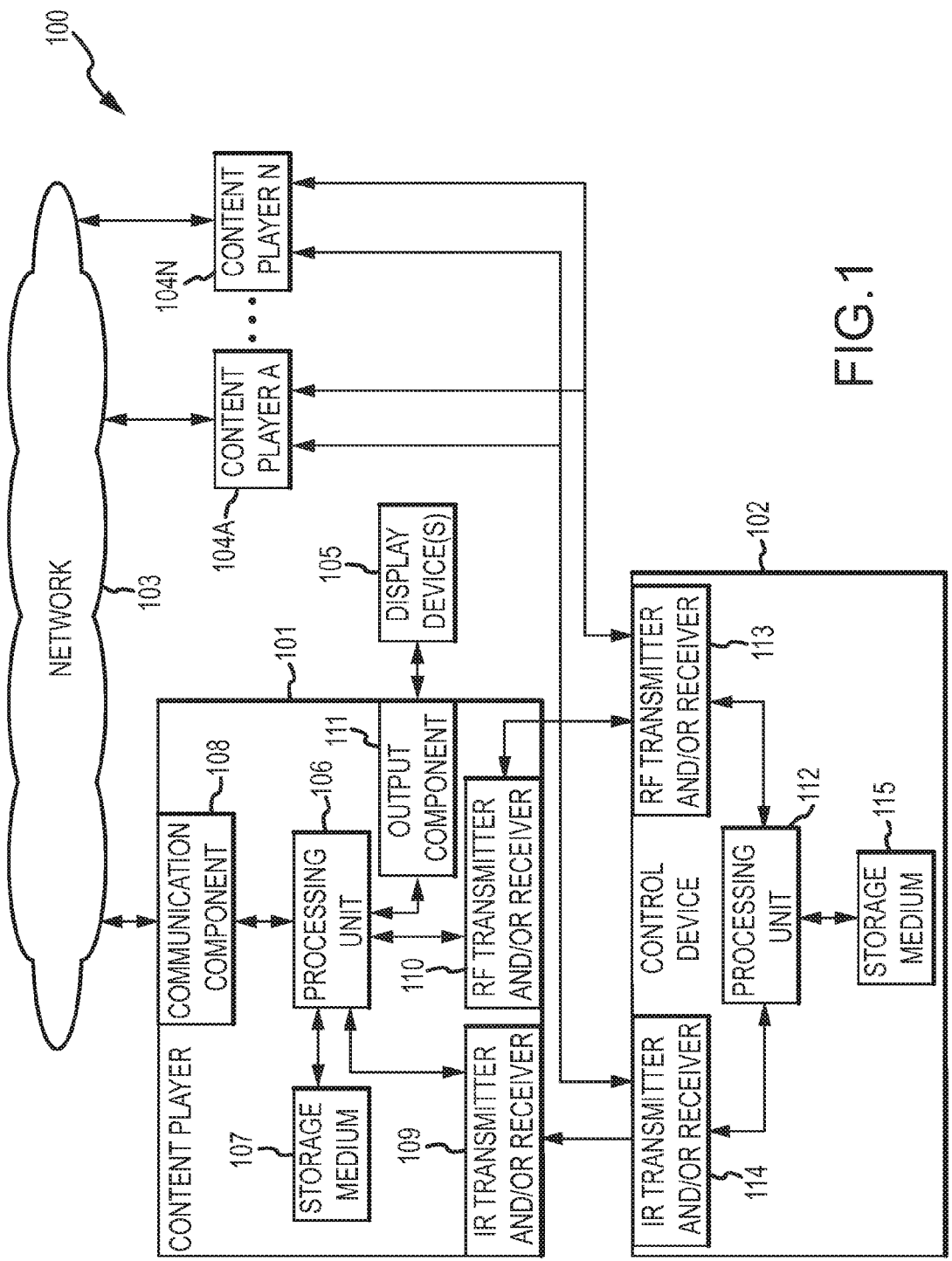
FIG. 1 is a block diagram illustrating a system for assisting use of control devices with different content players in a network of content players.

The description that follows includes sample systems, methods, and computer program products that embody various elements of the present disclosure. However, it should be understood that the described disclosure may be practiced in a variety of forms in addition to those described herein.

Electronic devices of varying kinds may perform any number of a variety of different functions. These functions may be performed in response to instructions received via one or more associated control devices, such as one or more remote control devices. Examples of such electronic devices include content players, electronic kitchen appliances, automobiles, televisions, set top boxes, television receivers, digital video recorders, television tuners, digital music players, desktop computers, laptop computers, cellular telephones, smart phones, mobile computing devices, environmental control systems, and so on.

In some cases, control devices may be dedicated to a particular electronic device. However, in other cases, a single control device may be configured to be utilized with one or more of a number of different electronic devices at a particular time. For example, a number of different electronic devices of a particular type may be arranged within a particular location. A control device may be configured such that the control device may be utilized to control any one of the different electronic devices at a particular time. This may be accomplished by pairing the control device with (or otherwise configuring the control device to control) the particular electronic device which the control device is to control. In order to utilize the control device to control a different electronic device, the control device may be paired with (or otherwise configuring the control device to control) the different electronic device unpairing the control device from (or otherwise configuring the control device to no longer control) the electronic device with which the control device was previously paired (or otherwise configured to control).

As such a control device may be utilized in a variety of different locations, the control device may request one or more acknowledgements for one or more commands that the control device transmits to an electronic device with which the control device is paired or otherwise configured to control. If the control device transmits a command and does not receive an acknowledgement, the control device may assume that either the electronic device did not receive the command or the control device was unable to receive the acknowledgement. In either case, the control device may determine that the control device can no longer be utilized to control the electronic device with which the control device is paired or otherwise configured to control.

Even though the control device may be able to thusly determine that the control device can no longer be utilized to control the electronic device with which the control device is paired or otherwise configured to control, the control device may be unable to determine a new electronic device that the control device should be paired with or otherwise configured to control. For example, the control device may not receive an acknowledgement for a transmitted command from a first electronic device which the control device is paired or otherwise configured to control because a user has taken the remote from the area where the first electronic device is located into an area where one or more other electronic devices are located. If the control device is paired with or otherwise configured to control the one or more other electronic devices then the user may be able to utilize the control device with the one or more other electronic devices. However, as the control device can no longer be utilized to control the first electronic device, the control device may be effectively useless to the user until the control device is paired with or otherwise configured to control the one or more other electronic devices.

The present disclosure discloses systems and methods for assisting use of control devices with different electronic devices. A control device (such as a remote control device) may determine that an acknowledgement is not received in response to a command transmitted to a first electronic device which the control device is configured to control. In response to this determination, the control device may broadcast a discovery message to all electronic devices that are operable to be controlled by the control device and are within range of the signal utilized to broadcast the discovery message. The control device may receive a response to the discovery message from a second electronic device that received the discovery message and at least one proximity signal that was transmitted by the control device. Utilizing configuration information included in the response, the control device may configure itself to control the second electronic device and may transmit an acknowledgement of such to the second electronic device. If the second electronic device is configured to communicate with the first electronic device, the second electronic device may notify the first electronic device that the control device is now configured to control the second electronic device.

FIG. 1 is a block diagram illustrating a system 100 for assisting use of control devices with different content players in a network of content players. The system 100 includes a content player 101 and content players A-N 104A-104N (which each may be any kind of content player such as a set top box, a television receiver, a digital video recorder, a television tuner, a digital music player, a desktop computer, a laptop computer, a cellular telephone, a smart phone, a mobile computing device, and/or any other kind of device operable to play content) that are communicably coupled by one or more networks 103 (which may be an Ethernet network, a coaxial cable network, a MoCA® (Multimedia Over Coax Alliance) network, a WiFi network, a HomePlug network, and/or any other kind of network that communicably connects the content player 101 and the content players A-N 104A-104N). The system may also include a control device 102 which may be configured to control the content player 101 and/or the content players A-N 104A-104N in order to control the content player 101 and/or the content players A-N 104A-104N.

The content player 101 (and/or the content players A-N 104A-104N) may include one or more processing units 106, one or more non-transitory storage media 107 (which may take the form of, but is not limited to, a magnetic storage medium; optical storage medium; magneto-optical storage medium; read only memory; random access memory; erasable programmable memory; flash memory; and so on), one or more communication components 108, one or more infrared (IR) transmitters and/or receivers 109, one or more radio frequency (RF) transmitters and/or receivers 110, and/or one or more output components 111. The processing unit 106 may execute instructions stored in the non-transitory storage medium 107 to transmit content (such as content stored in the non-transitory storage medium 107 and/or content being received via the communication component 108 and/or non-networked communication components not shown such as a satellite receiver component) to one or more presentation devices, such as one or more display devices 105 and/or devices not shown such as audio amplifiers, via the output component. Further, the processing unit 106 may execute instructions stored in the non-transitory storage medium 107 to communicate with other content players connected to the network 103 via the communication component and/or send signals to and/or receive signals from the control device 102 via the infrared transmitter and/or receiver 109 and/or the radio frequency transmitter and/or receiver 110.

The control device 102 may include one or more processing units 112, one or more non-transitory storage media 115, one or more IR transmitters and/or receivers 114, and/or one or more RF transmitters and/or receivers 113. The processing unit 112 may execute instructions stored in the non-transitory storage medium 115 to initiate a configuration sequence to configure to control the content player 101 and/or the content players A-N 104A-104N and/or control the content played of the content player 101 and/or the content players A-N 104A-104N with which the control device is configured to control. In some cases, such operations may be performed in response to user input received via one or more user input elements included by the control device (not shown). For example, the control device may include a dedicated "configure to control device" button that initiates a configuration sequence to configure the control device to control a content player which is within IR signaling proximity of the control device. By way of another example, attempting to utilize the control device with a content player that is not currently configured to be controlled with the control device may initiate a configuration sequence to configure the control device to control the content player not previously controlled by the control device.

In various implementations, a configuration sequence to configure the control device 102 to control one of the content player 101 and/or the content players A-N 104A-104N may include transmitting a RF signal to the content receiver with which the control device is currently configured to control via the RF transmitter and/or receiver 113 and transmitting an IR signal to a content player which is within IR signaling proximity to the control device (and to which the control device is to be configured to control) via the IR transmitter and/or receiver 114. As the IR signal may only be received by a content player that is located proximate and within line-of-sight to the control device, if a user indicates via the control device that the user wishes to utilize the control device in a particular area it is probable that only a content player in that particular area may receive the IR signal As the RF signal may have a greater range than the IR signal and may pass through structures such as walls and doors, it is probable that the content player with which the control device is currently configured to control may receive the RF signal even if that content player is not in the particular area where the user indicates that the user wishes to utilize the control device. In some cases, the configuration sequence may also include transmitting an instruction to a component associated with the content player within IR signaling proximity of the control device (such as the display device 105) to activate (power on) via the IR transmitter and/or receiver 114.

The content player with which the control device 102 is already configured to control, such as the content player 101, may receive the RF signal. If the content player 101 also receives the IR signal, such as if the content player 101 is within the area where the user indicated that the user wished to utilize the control device, the content player 101 may abort the configuration sequence as the content player 101 is already controlled by the control device.

If, however, the content player 101 does not receive the IR signal, the content player 101 may determine whether or not another content player connected to the network 103 (such as one of the content players A-N 104A-104N) notifies the content player 101 that the other content player has received the IR signal. If so, the content player 101 may determine that the user has requested to configure the control device 102 to control the other content player. As such, the content player 101 may command the control device to instruct a presentation device (such as the display device 105) associated with the other content player to activate (i.e., power on). Such a command may include one or more IR codes for activating the component associated with the other content player (which may be stored in the non-transitory storage medium 107 and/or the non-transitory storage medium 115). The other content player may present a prompt via the associated component that may request the user to confirm that the user wishes to configure the control device to control the other content player and/or associated equipment. If an affirmative response is received, the content player 101 may instruct the control device to allow the control device to be configured to control the other content player. Such instruction may include commanding the control device to utilize an entry in a table of control entries that corresponds to the other content player. Alternatively, such instruction may include instructing the control device to unpair from the control device so that the other content player may pair with the control device.

However, even if a target content player is within the area in which the user has indicated that the user wishes to utilize the control device 102, the target content player may not receive the IR signal (such as if an IR transmitter and/or receiver of the target content player is blocked). As such, if the content player (such as the content player 101) that receives the RF signal determines that another content player connected to the network 103 (such as one of the content players A-N 104A-104N) has not notified the content player 101 that the IR signal was received, the content player 101 may command the control device to instruct all presentation devices known to the control device to be associated with any content player connected to the network 103 to activate. The content player 101 may also command all content players connected to the network 103 to present a prompt requesting the user confirm whether or not to configure the control device to control the respective content player on the presentation device associated with the respective content player. The content player 101 may then determine which of the content players connected to the network 103 to which the user wishes to configure the control device to control based on which response is received for which prompt. As such, the content player 101 may instruct the control device to allow the control device to be configured to control the determined content player. Such instruction may include commanding the control device to utilize an entry in a table of control entries that corresponds to the determined content player. Alternatively, such instruction may include instructing the control device to unpair from the control device so that the determined content player may pair with the control device.

In one or more implementations, the control device 102 may store a table of control entries received from one or more content players (such as the content player 101 and/or the content players A-N 104A-104N) connected to the network 103. Each of the control entries may correspond to one of the content players and may include a control entry for the respective content player (such as a RF entry) and a set of command codes (such as IR command codes) for components that are associated with the respective content player. The control device 102 may be configured to control and/or configured to no longer control one or more of the content players by configuring which of the entries in the table the control device is set to utilize. As such, when the control device reconfigures to no longer control a particular content player and to control another content player, the control device may be configured to utilize the entry corresponding to the other content player instead of the entry corresponding to the particular content player.

In such implementations, the table of control entries may be constructed by one or more of content players connected to the network 103, such as the content player 101 and/or the content players A-N 104A-104N. In constructing the table of control entries, the content player may communicate with other content players connected to the network in order to determine entries to create for each content player, command codes to include in the entries for the respective content player for associated components (though some entries may not include command codes for components associated with the content player corresponding to that entry as some content players may not be associated with components), and so on. If the content player constructing the table of control entries determines that the control device 102 does not currently store the table of entries, the content player may transmit the table of entries to the control device and also may instruct the control device as to which of the entries to utilize. The control device may subsequently be reconfigured to no longer control a currently controlled content player and to control a different content player by updating which entry in the table of pairing entries that the control device is configured to utilize.

Additionally, one or more of the content players connected to the network 103, such as the content player 101 and/or the content players A-N 104A-104N, may determine that the table of entries stored by the control device 102 contains information that is inaccurate. The information in the table of entries stored by the control device may be out of date if one or more content players have been added to and/or removed from the network, if one or more components have been associated and/or de-associated with one or more content players connected to the network, and so on. If the content player determines that that the table of entries stored by the control device 102 contains information that is inaccurate, the content player may command the control device to update the inaccurate information. Such updating may be performed as soon as the information becomes inaccurate, upon a set update schedule (such as at 3 am every morning), and so on.

Although the system 100 is illustrated and described above such that the first signal is an RF signal and the second signal is an IR signal, other signal types are possible. For example, the second signal may be a type of signal other than an IR signal that may be received by content players within a certain proximity to the control device (such as twenty feet) whereas the first signal may be a type of signal other than a RF signal that may be received by a content player paired with the control device that is outside of the certain proximity to the control device.

Figure 2:
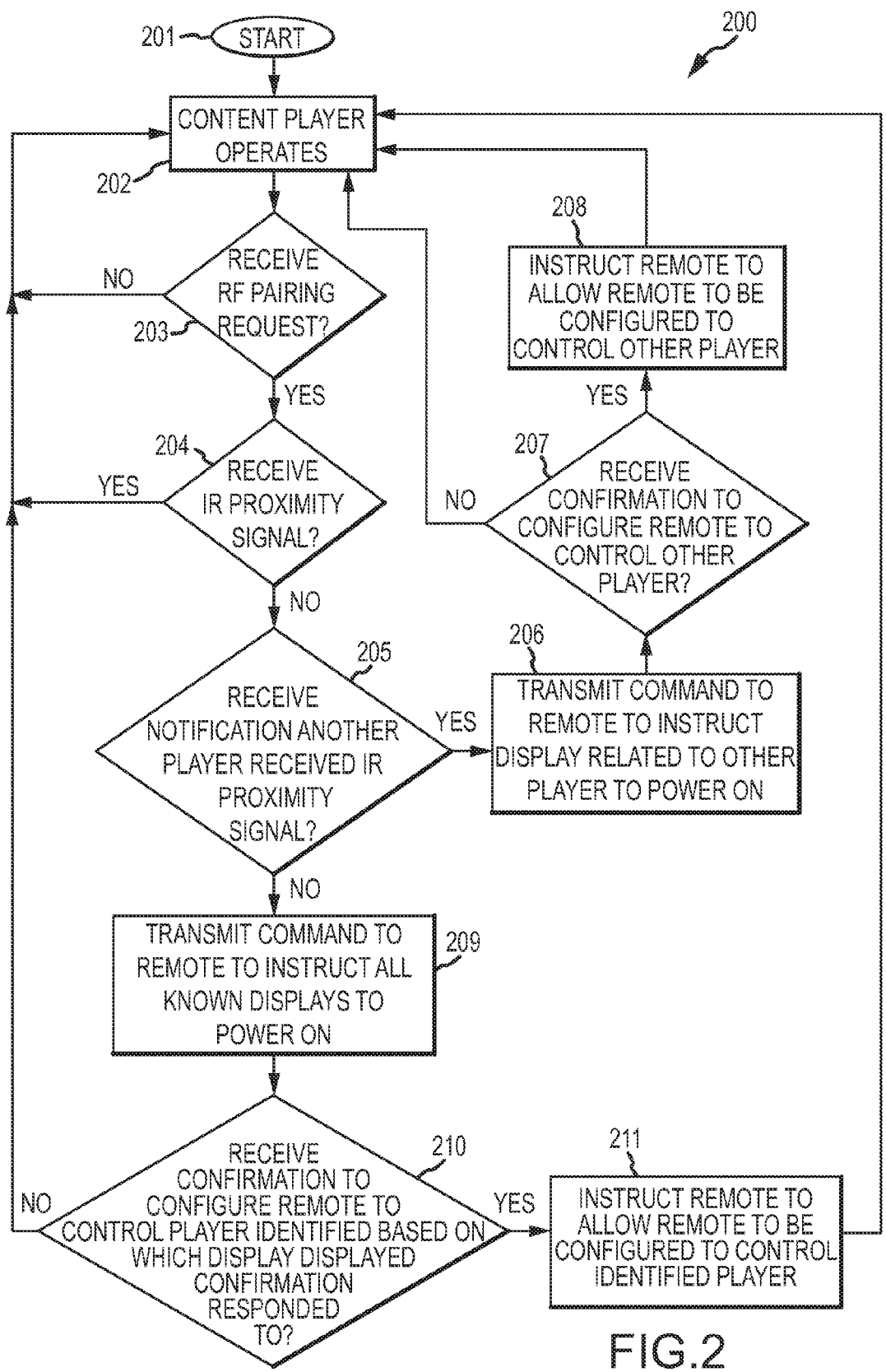
FIG. 2 is a flow chart illustrating a first example method for assisting use of control devices with different content players in a network of content players. This method may be performed by the system of FIG. 1.

FIG. 2 illustrates a method 200 for assisting use of control devices with different content players in a network of content players. The method 200 may be performed by the content player 101 of FIG. 1. The flow begins at block 201 and proceeds to block 202 where content player 101 operates. The flow then proceeds to block 203 where the processing unit 106 determines whether or not the content receiver 101 receives a first signal from a control device 102 (such as a remote control device) that is currently configured to control the content receiver 101 indicating that a user intends to utilize the control device in an area. If so, the flow proceeds to block 204. Otherwise, the flow returns to block 202 where the content receiver 101 continues to operate.

At block 204, after the processing unit 106 determines that the content receiver 101 receives the first signal, the processing unit determines whether or not the content receiver 101 receives a second signal that the control device 102 transmitted to a content player located in the area in which the user intends to utilize the control device. If so, the flow returns to block 202 and the content player 101 continues to operate, as the content player 101 is already controlled by the control device. Otherwise, the flow proceeds to block 205.

At block 205, after the processing unit 106 determines that the content receiver does not receive the second signal, the processing unit determines whether or not the content receiver receives a notification from another content player connected to the network 103 indicating that the other content receiver received the second signal. If so, the flow proceeds to block 206. Otherwise, the flow proceeds to block 209.

At block 206, after the processing unit 106 determines that the content receiver 101 receives the notification, the processing unit transmits a command to the control device 102 to instruct a display related to the other content player to activate (i.e., power on). The flow then proceeds to block 207. At block 207, the processing unit determines whether or not a confirmation to configure the control device to control the other player has been received. If so, the flow proceeds to block 208. Otherwise, the flow returns to block 202 and the content player 101 continues to operate under the control of the control device.

At block 208, after the processing unit 106 determines that a confirmation to configure the control device 102 to control the other content player has been received, the processing unit instructs the control device to allow the control device to be configured to control the other content player. As part of such, if the control device is not capable of controlling multiple content players simultaneously, the processing unit may instruct the control device to reconfigure such that the control device no longer controls the content player 101. The flow then returns to block 202 and the content player continues to operate.

At block 209, after the processing unit 106 determines that the content receiver 101 does not receive the notification, the processing unit transmits a command to the control device 102 to instruct all displays known to the control device to be associated with any content player connected to the network 103 to activate (i.e., power on). The processing unit may also signal the other content players to display confirmation prompts on their associated displays indicating for the user to make a particular selection to configure the control device to control the content player associated with that display. The flow then proceeds to block 210. At block 210, the processing unit determines whether or not a confirmation to configure the control device to control another content player identified based on the display which displayed the confirmation prompt to which a response was received. If so, the flow proceeds to block 211. Otherwise, the flow returns to block 202 and the content player 101 continues to operate.

At block 211, after the processing unit 106 determines that a confirmation to configure the control device 102 to control another content player was received based on the displayed confirmation prompt, the processing unit instructs the control device to allow the control device to be configured to control the identified content player. As part of such, if the control device is not capable of controlling multiple content players simultaneously, the processing unit may instruct the control device to reconfigure such that the control device no longer controls the content player 101. The flow then returns to block 202 and the content player continues to operate.

Although the method 200 is illustrated and described as including particular operations performed in a particular order, other arrangements of other operations are within the scope of the present disclosure. By way of a first example, in other implementations, the order of blocks 203 and 204 may be reversed. By way of another example, the control device 102 may be configured to anticipate receipt of the command transmitted in either block 206 or 209 and if such a command is not received with a period of time (such as two seconds), the control device may act as if the command transmitted in block 209 was received. As such, if the processing unit 106 determines at block 204 that the content receiver 101 receives the second signal, the processing unit may transmit a command to the control device instructing the control device to omit instructing any displays to power on.

Figure 3:
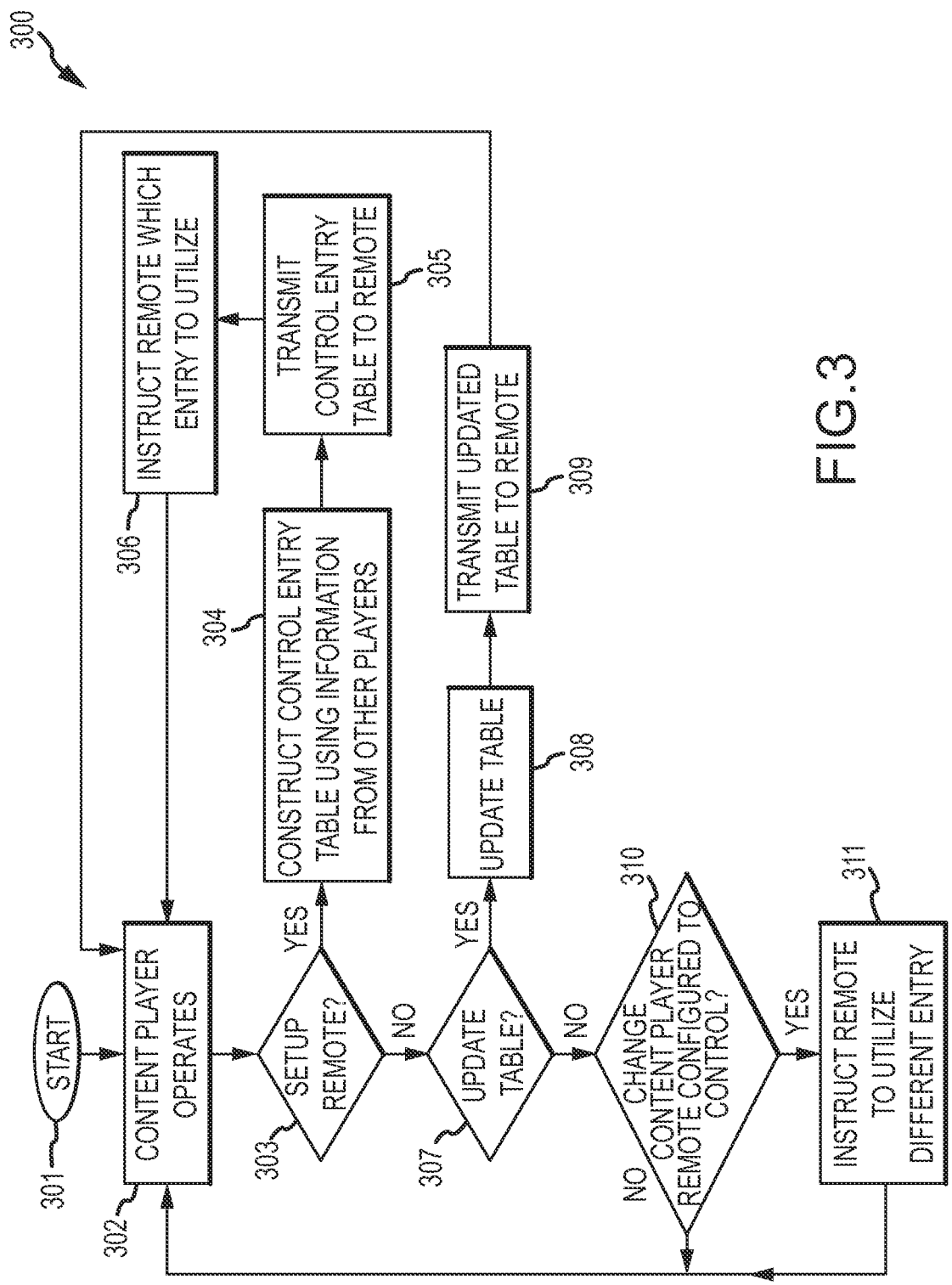
FIG. 3 is a flow chart illustrating a second example method for assisting use of control devices with different content players in a network of content players. This method may be performed by the system of FIG. 1.

FIG. 3 illustrates a method 300 for assisting use of control devices with different content players in a network of content players. The method 300 may be performed by the content player 101 of FIG. 1. The flow begins at block 301 and proceeds to block 302 where the content player 101 operates. The flow then proceeds to block 303 where the processing unit 106 determines whether or not to set up the control device 102 (such as a remote control device). The processing unit may determine to set up the control device if a request to configure the control device to control the content player 101 is received and the control device has not yet been configured to control a content player connected to the network 103. If so, the flow proceeds to block 304. Otherwise, the flow proceeds to block 307.

At block 304, after the processing unit 106 determines to set up the control device 102, the content player 101 constructs the table of control entries. As part of the table of control entries, the content player 101 communicates with other content players connected to the network 103 to determine entries to create as well as one or more sets of command codes (such as IR command codes) for components associated with the content player corresponding to the respective entry (though some entries may not include any command codes as some content players may not be associated with any components). The pairing entry table may also include information needed to allow the control device to communicate via RF with other content players (such as the content players 104A-N). Such information could include for example media access control (MAC) addresses, personal area network (PAN) identifiers and addresses, encryption keys, and so on. The flow then proceeds to block 305 where the processing unit transmits the table of control entries to the control device before the flow proceeds to block 306. At block 306, the processing unit transmits an instruction to the control device instructing the control device to utilize a particular entry of the table of control entries. The flow then returns to block 302 where the content player 101 continues to operate.

At block 307, after the processing unit 106 determines not to set up the control device 102, the processing unit determines whether or not to update the table of control entries. The processing unit may determine to update the table of control entries if the processing unit determines that information in the table has changed (such as in response to information received from another content player). If so, the flow proceeds to block 308. Otherwise, the flow proceeds to block 310.

At block 308, the processing unit 106 determines to update the table of control entries, the processing unit updates the table of control entries. Then the flow proceeds to block 309 where the processing unit transmits the updated table to the control device 102 before the flow returns to block 302 and the content player 101 continues to operate.

At block 310, the processing unit 106 determines not to update the table of control entries, the processing unit determines whether or not to change content player to which the control device 102 is configured to control. If not, the flow returns to block 302 where the content player 101 continues to operate. Otherwise, the flow proceeds to block 311 where the processing unit transmits an instruction to the control device instructing the control device to utilize a different entry in the table of control entries that corresponds to the content player to which the control device is to be configured to control. The flow then returns to block 302 where the content player 101 continues to operate.

Although the method 300 is illustrated and described as including particular operations performed in a particular order, other arrangements of other operations are within the scope of the present disclosure. For example, blocks 308 and 309 are illustrated as separate operations performed in a linear sequence. However, in various implementations the content player 101 may instruct the control device 102 to update the stored table instead of updating the table and then transmitting the updated table to the control device.

Figure 4A:
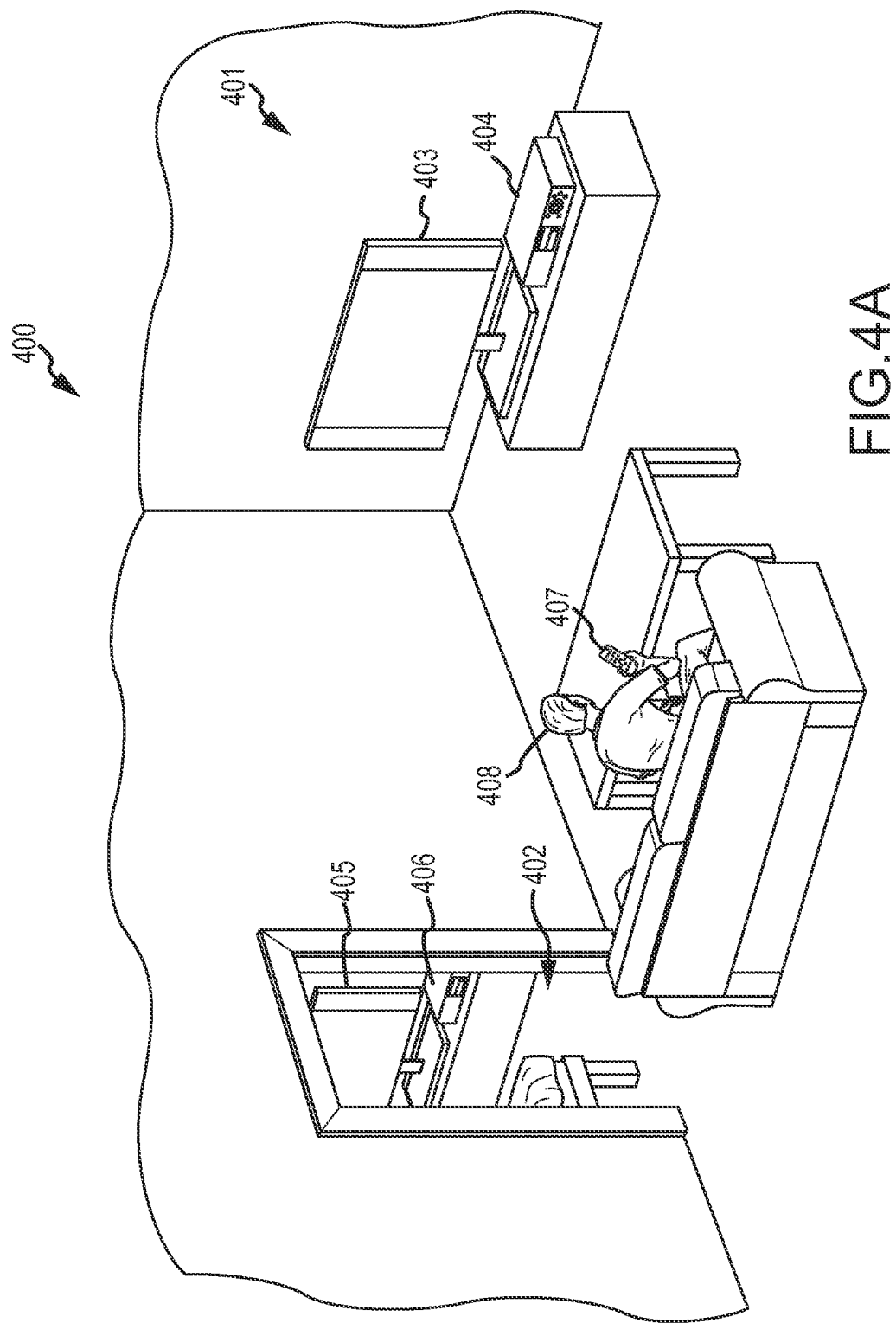
FIGS. 4A-4E are diagrams illustrating a user utilizing a system for assisting use of control devices with different content players in a network of content players. The system may be the system of FIG. 1.

FIGS. 4A-4E illustrate a user 408 utilizing a system 401 for assisting use of a control device 407 with different content players 404 and 406 in a network of content players. As illustrated in FIG. 4A, a user 408 is present in a living room 401. The user is illustrated as holding a remote control device 407 that is configured to control a set top box 404. The set top box 404 is associated with a television 403. The remote control may contain information related to controlling the television 403 with IR transmissions. However, the television 403 is not illustrated as powered on (although in other implementations the television 403 may be powered on or powered off). As also illustrated in FIG. 4A, a bedroom 402 is separate from the living room 401. A set top box 406 and an associated television 405 are located in the bedroom 402. However, the television 405 is also not illustrated as powered on.

Figure 4B:
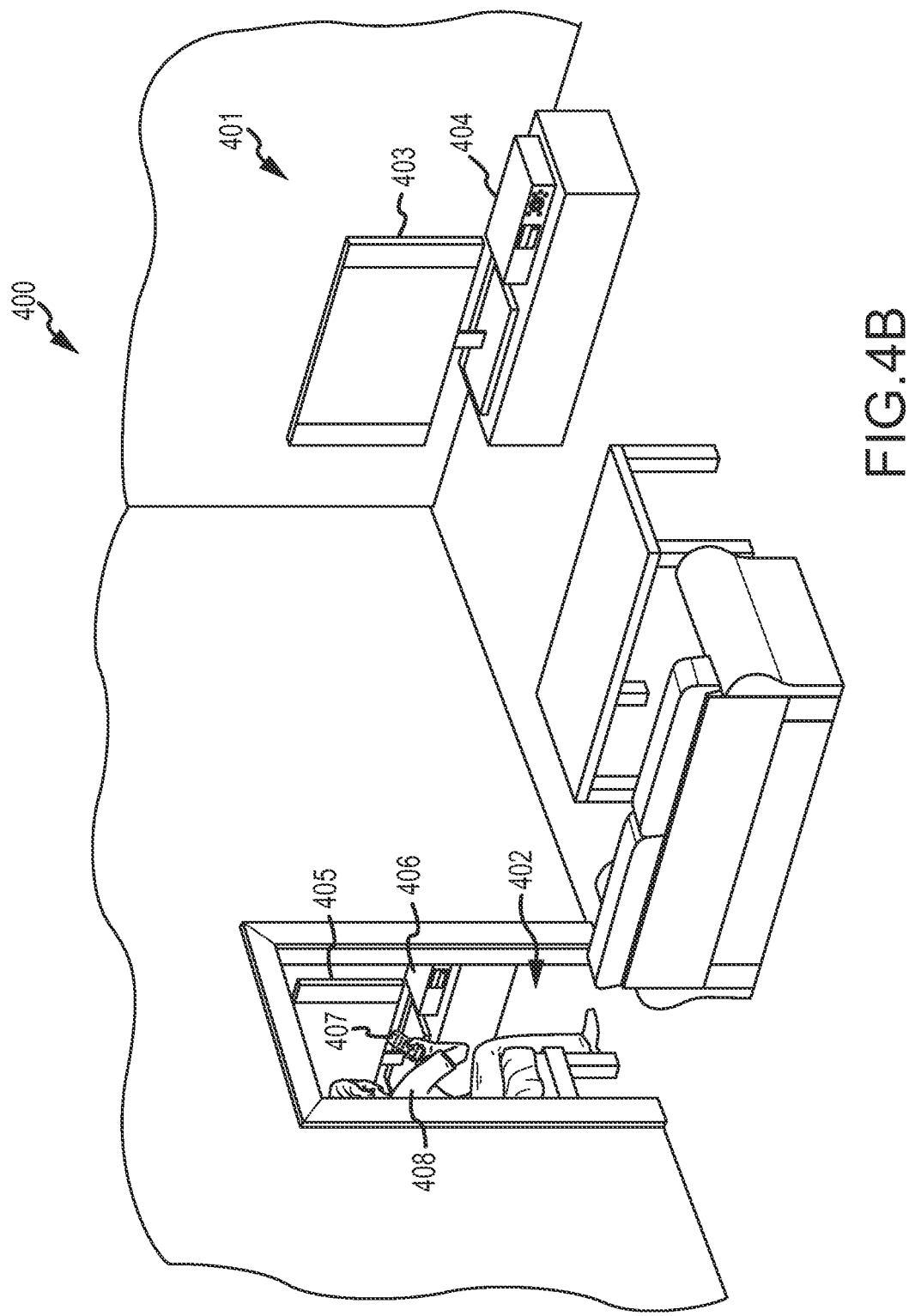
Figure 4C:
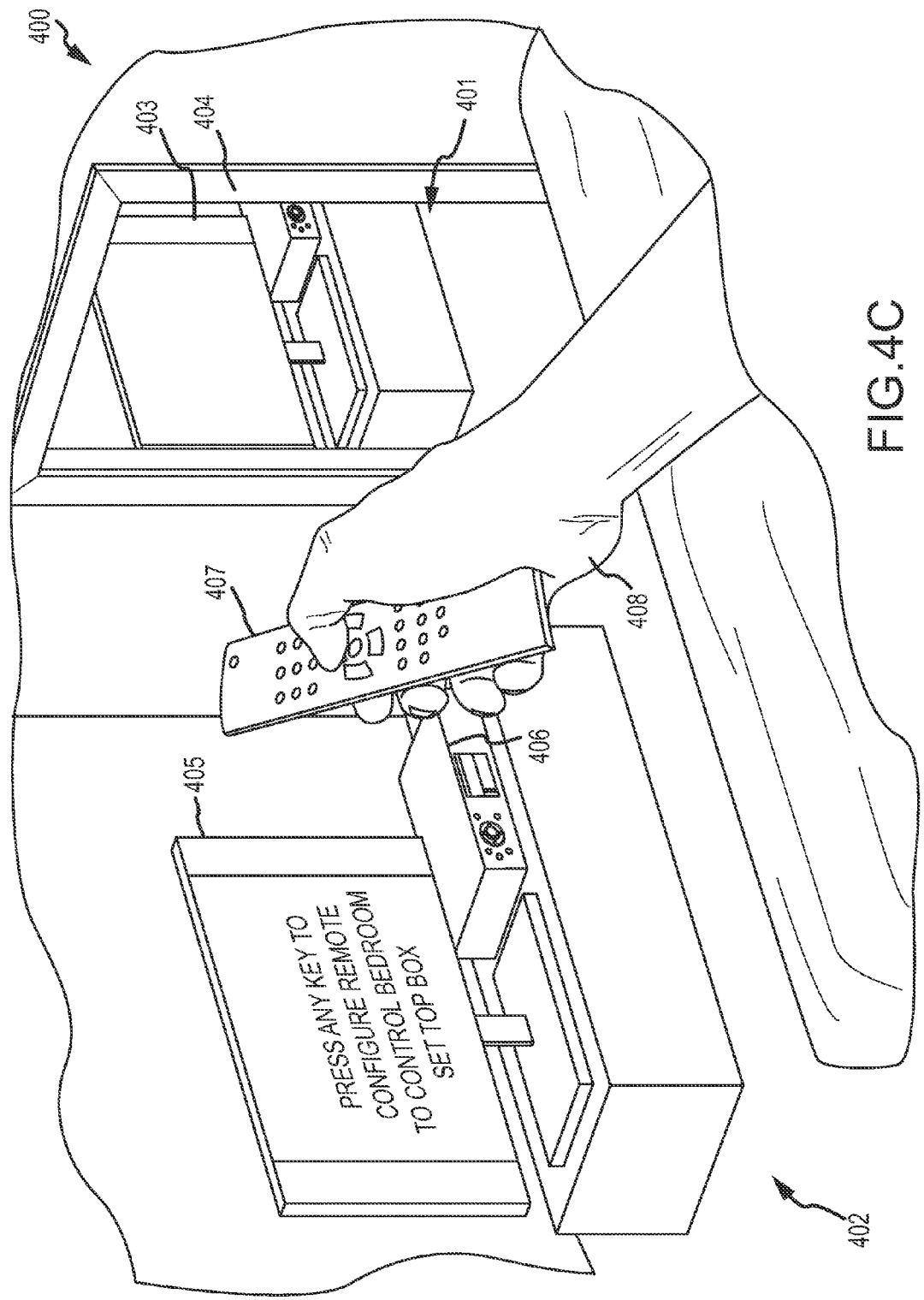
Figure 4D:
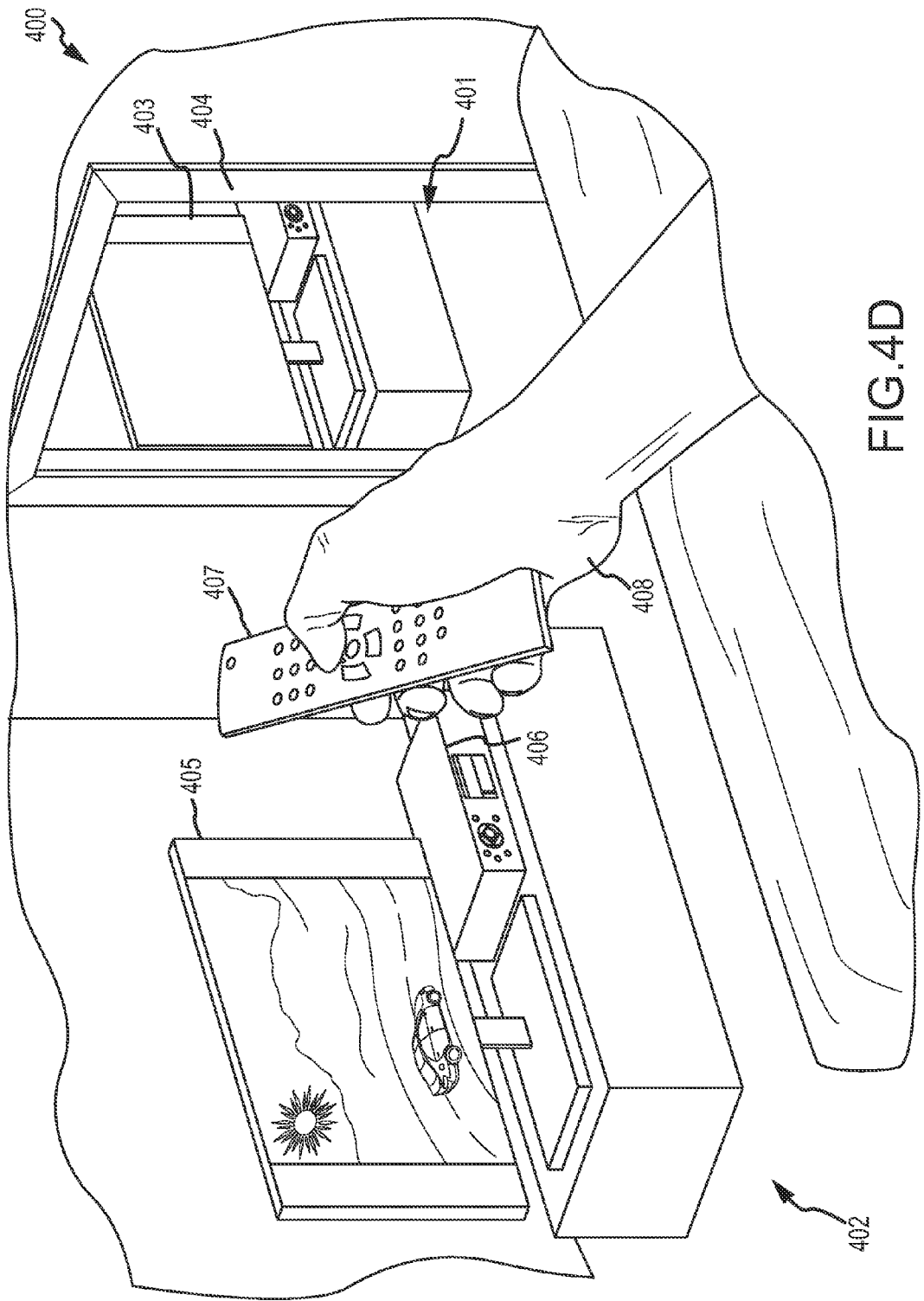

As illustrated in FIG. 4B, the user 408 may move into the bedroom 402 and indicate via one or more buttons or other controls of the remote control device 407 that the user wishes to utilize the remote control device in the bedroom. As such, the remote control device may transmit a first signal to the set top box with which the remote control device is configured to control (i.e., the set top box 404) and a second signal to a set top box in the area of the bedroom (i.e., the set top box 406). The set top box 404 may receive the first signal and may receive a notification from the set top box 406 that the set top box 406 has received the second signal. In response, the set top box 404 may command the remote control device to instruct the television 405 to activate or power on. As illustrated in FIG. 4C, the television 405 may then power on and the set top box 406 may display a confirmation prompt on the television 405 requesting that the user confirm that the user wishes to configure the remote control device to control the set top box 406. If confirmation is received, the remote control device may be instructed by set top box 404 (in this implementation) to reconfigure from being configured to control the set top box 404 to being configured to control the set top box 406. The reconfiguration may be accomplished by utilizing a different control entry in a memory of the remote control. In other implementations, the reconfiguration may be accomplished by depairing the remote control from the set top box 404 and pairing the remote control with the set top box 406. The remote control device may then be utilized to control the set top box 406 as illustrated in FIG. 4D.

Figure 4E:
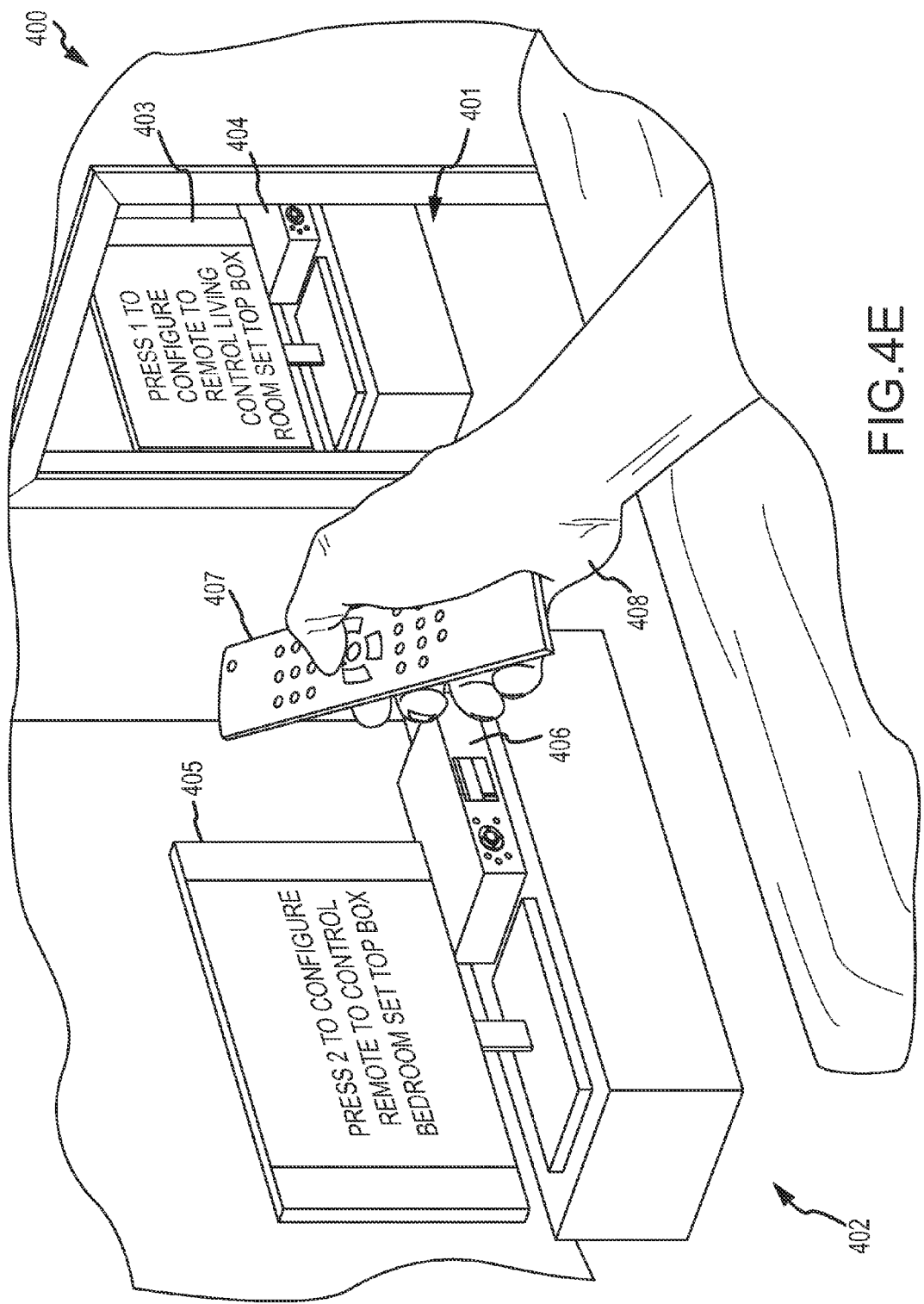

However, returning to FIG. 4B, the set top box 404 may receive the first signal but may not receive a notification from the set top box 406 that the set top box 406 has received the second signal. This may be because the set top box 406 did not receive the second signal. Hence, the set top box 404 may command the remote control device 407 to instruct all known televisions to activate or power on and command set top boxes associated with such televisions to display a prompt asking the user 408 to confirm that the user wishes to utilize the remote control device with the set top box associated with that television, as illustrated in FIG. 4E. If confirmation is received in response to the prompt displayed by one of the televisions, the remote control device may be configured to control the set top box that displayed the prompt (if the remote control is not already configured to control the set top box that displayed the prompt, in which case the configuration is not changed). If a response to the confirmation displayed by the television 405 is received, indicating that the user has selected to configure the remote control device to control the set top box 406, the remote control device may reconfigure from being configured to control the set top box 404 and TV 403 to being configured to control the set top box 406 and TV 405. The reconfiguration may be accomplished by utilizing a different control entry in a memory of the remote control. In other implementations, the reconfiguration may be accomplished by depairing the remote control from the set top box 404 and pairing the remote control with the set top box 406. The remote control device may then be utilized to control the set top box 406 as illustrated in FIG. 4D.

Returning to FIG. 1, in various implementations the control device 102 and/or the content player 101 may perform one or more methods for assisting use of control devices with different electronic devices. Although the electronic devices are illustrated in FIG. 1 and described above as content players 101 and/or content players A-N 104A-104N, in various implementations the electronic devices may be other kinds of electronic devices without departing from the scope of the present disclosure. For example, such electronic devices may include content players, electronic kitchen appliances, automobiles, televisions, set top boxes, television receivers, digital video recorders, television tuners, digital music players, desktop computers, laptop computers, cellular telephones, smart phones, mobile computing devices, environmental control systems, and so on. Additionally, though the electronic devices illustrated in FIG. 1 and described above as all being configured to communicate via the network 103, such electronic devices may or may not be configured to communicate via such a network without departing from the scope of the present disclosure.

In these various implementations, the control device 102 may be configured to control the content player A 104A. The processing unit 112 of the control device may execute instructions stored in the non-transitory storage medium 115 to transmit one or more commands to the content player 104A. In some cases, the command may be transmitted via one or more signals transmitted by the RF transmitter and/or receiver 113 (such as one or more RF signals) and/or the IR transmitter and/or receiver 114 (such as one or more IR signals). In other cases, the command may be transmitted by one or more other communication components (not shown) of the control device. When the processing unit 112 transmits such a command, the processing unit 112 may request an acknowledgement from the content player 104A to ensure that the transmitted command is received by the content player 104A.

After transmitting a command to the content player 104A, the processing unit 112 may determine that the acknowledgement is not received. In some cases, the acknowledgement may not be received because the content player 104A did not receive the command and did not transmit the acknowledgement. In other cases, the content player 104A may have received the command, but may have not transmitted the acknowledgement. In still other cases, the content player 104A may have transmitted the acknowledgement, but the processing unit 112 may still have not received the acknowledgement.

Regardless, upon determining that the acknowledgement is not received, the processing unit 112 may broadcast one or more discovery messages to all electronic devices within range of one or more signals utilized to broadcast the discovery message (such as one or more RF signals transmitted via the RF transmitter and/or receiver 113) that are operable to be controlled by the control device 102. The electronic devices (such as the content player 101 and/or any of the content players illustrated in FIG. 1 and described above other than content player A 104A) that receive such a discovery message may determine whether or not they also received a proximity message transmitted by the control device. Such a proximity message may be transmitted via a type of signal, such as an IR signal transmitted by the IR transmitter and/or receiver 114, that has a limited range and/or a line-of-sight restriction such that the proximity message will be received if the control device is within the limited range when transmitting. Further, such a proximity message may be at least a portion of the command transmitted by the processing unit 112 to the content player A 104A, may be transmitted when the discovery message is transmitted (and/or prior to broadcast of the discovery message), and/or may be otherwise transmitted by the control device to indicate to electronic devices whether or not they are proximate to the control device. If the electronic devices receive the discovery message and the proximity signal, the electronic devices may determine that they are proximate to the control device and may transmit one or more responses to the control device. Such responses may include information for configuring the control device to control the respective electronic device.

The processing unit 112 may utilize the information included in the response to configure the control device 102 to control the respective electronic device. The processing unit 112 may also transmit an acknowledgement utilizing the RF transmitter and/or receiver 113, the IR transmitter and/or receiver 114, and/or another communication component (not shown) to the respective electronic device indicating that the control device is now configured to control the respective electronic device. If the respective electronic device is configured to communicate with the content player A 104A, the respective electronic device may notify the content player A 104A via the network 103 that the control device is now configured to control the respective electronic device.

For example, the broadcast message and the proximity signal may be received by the content player 101. As such, the content player 101 may transmit a response to the control device 102. The control device may then configure itself to control the content player 101 and may transmit an acknowledgment of such to the content player 101. As the content player 101 is configured to communicate with the content player A 104A, the content player 101 may notify the content player A 104A that the control device is now configured to control the content player 101.

In some cases, the control device 102 may be configured to control and/or cease controlling electronic devices by pairing/unpairing with the electronic devices. In such cases the configuration information included in the response may include information for pairing the control device with the electronic device that transmitted the response. As such, the control device may configure itself to control the electronic device that transmitted the response by unpairing itself from the electronic device with which the control device was previously paired and pairing itself with the electronic device that transmitted the response utilizing the pairing information included in the response.

In other cases, as discussed above, the control device 102 may store a table of control entries (such as in the non-transitory storage medium 115) for controlling a plurality of electronic devices. The control device 102 may configure itself to control a particular electronic device of the plurality by utilizing a particular entry of the table and/or may configure itself to no longer control the particular electronic device of the plurality by utilizing a different entry of the table. In such cases, the control device may receive and/or update such a table from one or more of the electronic devices. Additionally in such cases, the configuration information included in a response to a discovery message may include a specification of a particular entry of the table for the control device to utilize in order to control the respective electronic device.

In various cases, the control device 102 may receive responses from multiple electronic devices to a broadcast discovery message. In such a situation, the control device 102 may select one of the responding electronic devices to configure itself to control and may then configure itself to control the selected responding electronic device.

For example, the control device 102 may select the electronic device corresponding to the first response that is received. As the response is received first, the corresponding electronic device may be located closer to the control device than the electronic devices corresponding to responses that are received subsequently.

By way of another example, the control device 102 may select the electronic device corresponding to the response that is carried by a signal which has a higher signal strength than the signals that carry other received responses. As the signal has a higher signal strength, it is likely that the signal is transmitted by an electronic device that is more proximate to the control device than the electronic devices corresponding to responses received via signals with weaker signal strengths.

By way of a third example, the control device 102 may select the electronic device that it has previously been configured to control if one of the responses corresponds to such an electronic device and the other one or more other responses correspond to electronic devices that the control device has not been previously configured to control. As the control device has previously been utilized to control the respective electronic device, it is likely that the user may be attempting to utilize the control device to control the respective electronic device.

By way of a fourth example, electronic devices may include an authorization identifier (such as a serial number or other identifier) that indicates to the control device 102 that the respective electronic device is authorized to be utilized with the control device. In this way, the control device may be prevented from configuring itself to control with one or more electronic devices that the control device may not be designed and/or intended to control (such as one or more knock-off electronic devices).

By way of a fifth example, the control device 102 may select the electronic device that corresponds to one of the multiple responses in response to input received from a user. In some cases, the control device and/or the various electronic devices may present one or more prompts to which the user may respond via the control device. As such, the control device may select the electronic device that is specified by the user's input.

Figure 5:
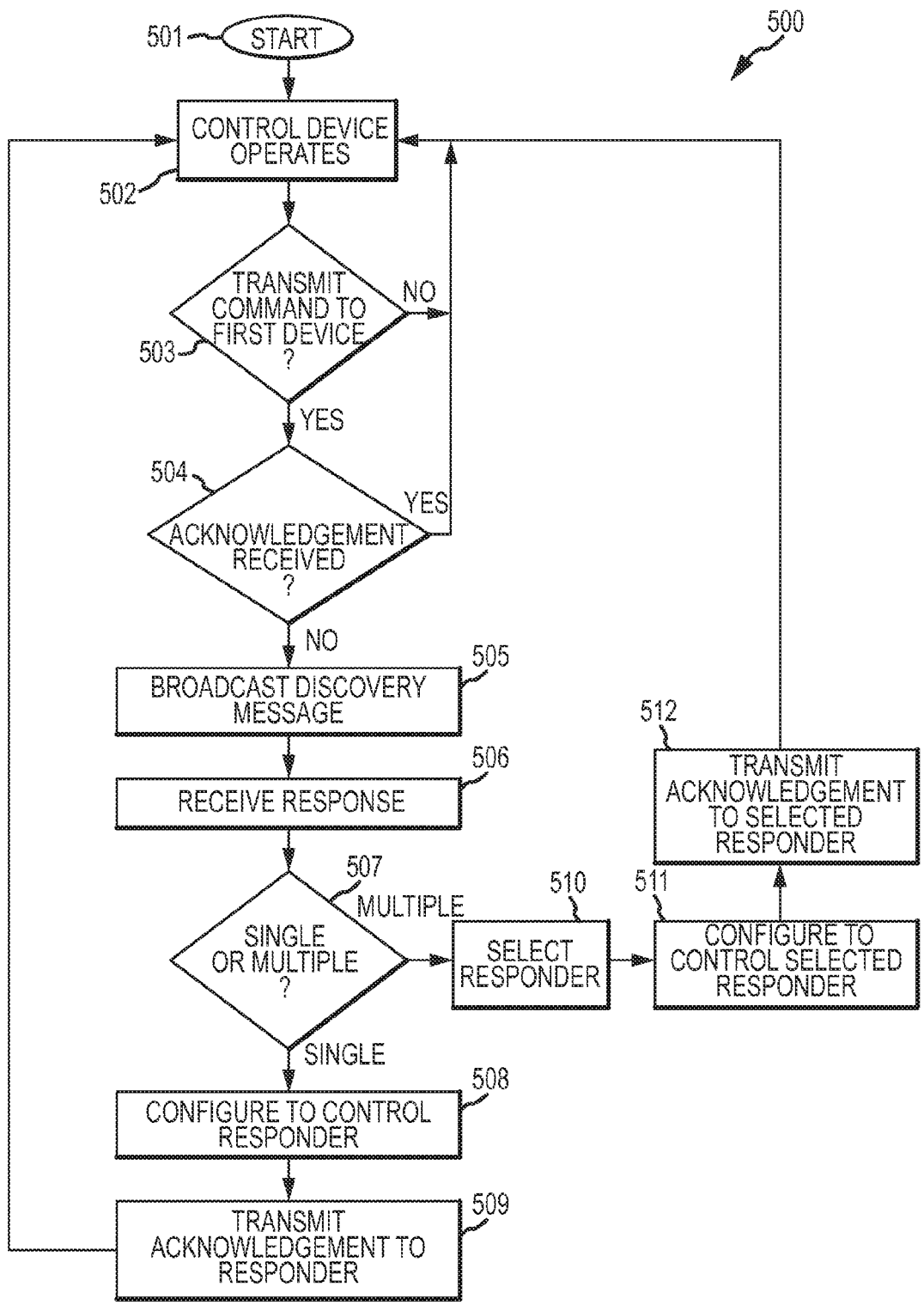
FIG. 5 a flow chart illustrating a first example method for assisting use of control devices with different electronic devices. This method may be performed by the control device of FIG. 1.

FIG. 5 illustrates a method 500 for assisting use of control devices with different electronic devices. The method 500 may be performed by the control device 102 of FIG. 1. The flow begins at block 501 and proceeds to block 502 where the control device operates. The flow then proceeds to block 503 where the processing unit 112 determines whether or not to transmit a command to a first electronic device which the control device is configured to control. The control device may determine whether or not to transmit the command to the first electronic device in response to input received from a user. If so, the control device transmits the command and the flow proceeds to block 504. Otherwise, the flow returns to block 502 and the control device continues to operate.

At block 504, after the processing unit 112 transmits the command, the processing unit determines whether or not an acknowledgement of the transmitted command is received from the first electronic device. If so, the flow returns to block 502 and the control device continues to operate. Otherwise, the flow proceeds to block 505.

At block 505, after the processing unit 112 determines that an acknowledgement of the transmitted command is not received from the first electronic device, the processing unit broadcasts a discovery message to all electronic devices within range of the discovery message that are operable to be controlled by the control device 102. The flow then proceeds to block 506 where the processing unit receives at least one response to the discovery request from one or more electronic devices that received the discovery message as well as a proximity signal transmitted by the processing unit. Such a proximity signal may be transmitted with the command and/or along with and/or previous to the discovery message. If at least one response has not been received, in some implementations the processing unit may continue to wait until a response is received. In other implementations, the processing unit may repeat broadcast of the discovery message. In still other implementations, the processing unit may present one or more error messages and the flow may end.

The flow then proceeds to block 507 where the processing unit 112 determines whether a single response has been received or whether multiple responses have been received. If a single response has been received, the flow proceeds to block 508. Otherwise, the flow proceeds to block 510.

At block 508, after the processing unit 112 determines that a single response has been received, the processing unit configures the control device 102 to control the responding electronic device utilizing configuration information included in the response. The flow then proceeds to block 509 where the processing unit transmits an acknowledgement to the responding electronic device that the control device is now configured to control the responding electronic device. Then the flow returns to block 502 and the control device continues to operate.

At block 510, after the processing unit 112 determines that multiple responses have been received, the processing unit selects one of the responding electronic devices. The flow then proceeds to block 511 where the processing unit configures the control device 102 to control the selected responding electronic device utilizing configuration information included in the response. Next, the flow proceeds to block 512 where the processing unit transmits an acknowledgement to the selected responding electronic device that the control device is now configured to control the selected responding electronic device before the flow returns to block 502 and the control device continues to operate.

Although the method 500 is illustrated and described as including particular operations performed in a particular order, other arrangements of other operations are within the scope of the present disclosure. For example, the processing unit 112 is illustrated and described as transmitting an acknowledgement to an electronic device after the processing unit configures the control device 102 to control the respective electronic device. However, in other implementations this acknowledgment may be sent simultaneously with the configuration and/or the processing unit may not transmit such an acknowledgement.

Figure 6:
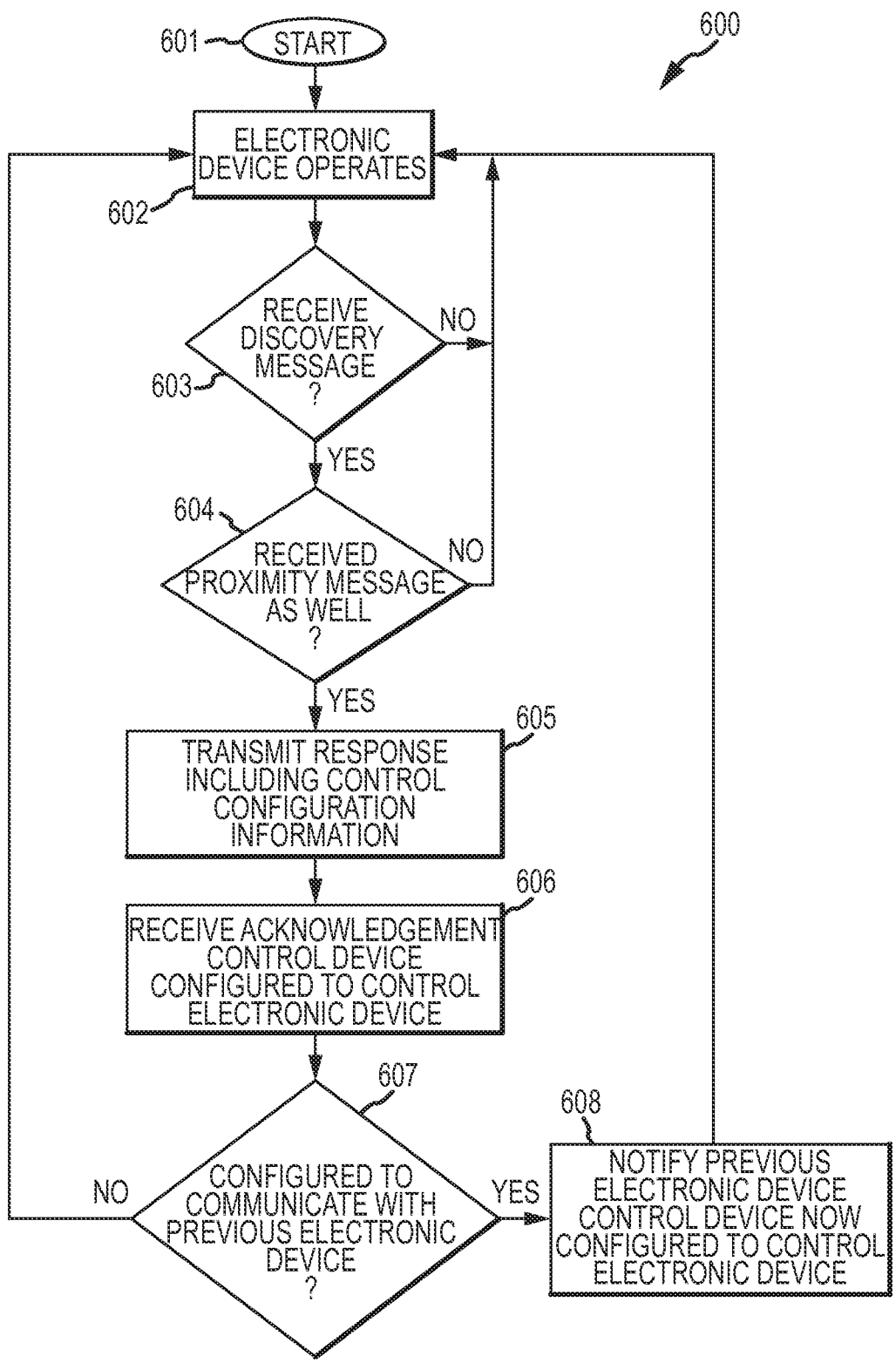
FIG. 6 a flow chart illustrating a second example method for assisting use of control devices with different electronic devices. This method may be performed by the content player of FIG. 1.

FIG. 6 illustrates a method 600 for assisting use of control devices with different electronic devices. The method 600 may be performed by an electronic device such as the content player 101 of FIG. 1. The flow begins at block 601 and proceeds to block 602 where the electronic device operates. The flow then proceeds to block 603 where the electronic device determines whether or not a discovery message from a control device 102 that has transmitted a command to a controlled electronic device and not received an acknowledgement is received. If so, the flow proceeds to block 604. Otherwise, the flow returns to block 602 and the electronic device continues to operate.

At block 604, after the electronic device determines that a discovery message from a control device 102 that has transmitted a command to a controlled electronic device and not received an acknowledgement is received, the electronic device determines whether or not a proximity signal from the control device has also been received. If so, the flow proceeds to block 605. Otherwise, the flow returns to block 602 and the electronic device continues to operate.

At block 605, after the electronic device determines that a proximity signal from the control device 102 has also been received, the electronic device transmits a response to the control device that includes configuration information for configuring the control device to control the electronic device. In some implementations, the received response may be provided as part of a responding device performing a set of multiple operations such as responding to the discovery request, receiving a pairing request, sending a pairing acceptance response, and so on. The flow then proceeds to block 606 where the electronic device receives an acknowledgement from the control device indicating that the control device is now configured to control the electronic device.

Next, the flow proceeds to block 607 where the electronic device determines whether or not the electronic device is configured to communicate with the previously controlled electronic device (such as via the network 103). If so, the flow proceeds to block 608. Otherwise, the flow returns to block 602 and the electronic device continues to operate as controlled by the control device.

At block 608, the electronic device notifies the previously controlled electronic device that the control device 102 is now configured to control the electronic device. The flow then returns to block 602 and the electronic device continues to operate as controlled by the control device.

Although the method 600 is illustrated and described as including particular operations performed in a particular order, other arrangements of other operations are within the scope of the present disclosure. For example, the electronic device is illustrated and described as determining whether or not a discovery message is received prior to determining whether or not a proximity signal has also been received. However, in other implementations, performance of these operations may be reversed, performed simultaneously, and so on.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for assisting use of control devices with different electronic devices, the method comprising:
   determining, utilizing a control device, that an acknowledgement is not received in response to at least one command transmitted by the control device to a first electronic device which the control device is configured to control;
   broadcasting at least one discovery message, utilizing the control device, to all electronic devices that are within range of at least one signal utilized to transmit the at least one discovery message and are operable to be controlled by the control device;
   receiving, utilizing the control device, at least one response to the at least one discovery message from a second electronic device that received the at least one discovery message and at least one proximity signal transmitted by the control device, wherein the at least one response to the at least one discovery message comprises pairing information about the second electronic device; and
   configuring the control device to control the second electronic device utilizing information included in the at least one response by unpairing the control device from the first electronic device and pairing the control device with the second electronic device utilizing the pairing information about the second electronic device included in the at least one response.

2. The method of claim 1, further comprising transmitting a configuration acknowledgement from the control device to the second electronic device indicating that the control device is configured to control the second electronic device.

3. The method of claim 1, wherein the at least one proximity signal is included in at least one of the at least one command or the at least one discovery message.

4. The method of claim 1, wherein at least one signal utilized to transmit the at least one discovery message comprises at least one radio frequency signal and the at least one proximity signal comprises at least one infrared signal.

5. The method of claim 1, wherein the second electronic device is configured to communicate with the first electronic device, further comprising notifying the first electronic device utilizing the second electronic device that the control device is configured to control the second electronic device.

6. The method of claim 1, wherein the control device receives at least one additional response to the at least one discovery message from at least one additional electronic device further comprising selecting the second electronic device to configure the control device to control.

7. The method of claim 6, wherein the control device performs said operation of selecting the second electronic device to configure the control device to control because at least one of:
   the control device receives the at least one response prior to the at least one additional response,
   the at least one response is carried by at least one first signal that has a higher signal strength than at least one second signal that carries the at least one additional response,
   the at least one response includes at least one valid authorization identifier and the at least one additional response does not include a valid authorization identifier,
   the control device has been previously configured to control the second electronic device but not the additional electronic device, or
   the control device receives at least one user input specifying to select the second electronic device.

8. The method of claim 1, wherein the control device includes at least one table of control entries for controlling a plurality of electronic devices that includes the first electronic device and the second electronic device wherein each of the control entries correspond to one of the plurality of electronic devices and wherein said operation of configuring the control device to control the second electronic device utilizing information included in the at least one response comprises configuring the control device to utilize the control entry corresponding to the second electronic device instead of the control entry corresponding to the first electronic device.

9. The method of claim 8, wherein the control device receives the at least one table of control entries from at least one electronic device of the plurality of electronic devices.

10. A system for assisting use of control devices with different electronic devices, comprising:
- a control device, comprising:
  - at least one first communication component configured to communicate utilizing a first type of signal and at least one second communication component configured to communicate utilizing a second type of signal; and
  - at least one processing unit that determines that an acknowledgement is not received in response to at least one command transmitted by the at least one first communication component to a first electronic device that the control device is configured to control;
- wherein, in response to determining that the acknowledgement is not received, the at least one processing unit:
  - broadcasts at least one discovery message utilizing the at least one first communication component to all electronic devices that are within range of at least one signal of the first type of signal transmitted by the at least one first communication component and are operable to be controlled by the control device;
  - receives at least one response utilizing the at least one first communication component to the at least one discovery message from a second electronic device that received the at least one discovery message and at least one proximity signal of the second type of signal transmitted by the at least one second communication component, wherein the at least one response to the at least one discovery message comprises pairing information about the second electronic device; and
  - configures the control device to control the second electronic device utilizing information included in the at least one response by unpairing the control device from the first electronic device and pairing the control device with the second electronic device utilizing the pairing information about the second electronic device included in the at least one response.

11. The system of claim 10, wherein the control device includes at least one non-transitory storage medium that stores at least one table of control entries for controlling a plurality of electronic devices that includes the first electronic device and the second electronic device wherein each of the control entries correspond to one of the plurality of electronic devices and wherein the at least one processing unit configures the control device to control the second electronic device utilizing information included in the at least one response by configuring the control device to utilize the control entry corresponding to the second electronic device instead of the control entry corresponding to the first electronic device.

12. The system of claim 10, wherein the control device receives the at least one table of control entries from at least one electronic device of the plurality of electronic devices.

13. The system of claim 10, wherein the at least one processing unit receives at least one additional response to the at least one discovery message from at least one additional electronic device and the at least one processing unit selects the second electronic device to configure the control device to control.

14. The system of claim 13, wherein least one processing unit selects the second electronic device to configure the control device to control because at least one of:
- the at least one processing unit receives the at least one response prior to the at least one additional response,
- the at least one response is carried by at least one first signal that has a higher signal strength than at least one second signal that carries the at least one additional response,
- the at least one response includes at least one valid authorization identifier and the at least one additional response does not include a valid authorization identifier,
- the control device has been previously configured to control the second electronic device but not the additional electronic device, or
- the at least one processing unit receives at least one user input specifying to select the second electronic device.

15. The system of claim 10, wherein the second electronic device is configured to communicate with the first electronic device and the second electronic device notifies the first electronic device that the control device is configured to control the second electronic device.

16. The system of claim 10, wherein the first type of signal comprises at least one radio frequency signal and the second type of signal comprises at least one infrared signal.

17. The system of claim 10, wherein the at least one proximity signal is transmitted when the at least one first communication component transmits at least one of the at least one command or the at least one discovery message.

18. The system of claim 10, wherein the at least one processing unit transmits a configuration acknowledgement to the second electronic device utilizing the at least one first communication component indicating that the control device is configured to control the second electronic device.

\* \* \* \* \*